(12) United States Patent
Goenka et al.

(10) Patent No.: US 10,958,609 B2
(45) Date of Patent: Mar. 23, 2021

(54) CONTROLLING A GRAPHICAL USER INTERFACE BASED UPON A PREDICTION OF A MESSAGING ACTION OF A MESSAGING ACCOUNT

(71) Applicant: Yahoo Holdings, Inc., Sunnyvale, CA (US)

(72) Inventors: Mohit Goenka, Santa Clara, CA (US); Nikita Varma, Milpitas, CA (US); Ashish Khushal Dharamshi, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 216 days.

(21) Appl. No.: 15/835,613

(22) Filed: Dec. 8, 2017

(65) Prior Publication Data
US 2019/0182194 A1 Jun. 13, 2019

(51) Int. Cl.
*H04L 12/58* (2006.01)

(52) U.S. Cl.
CPC ............. *H04L 51/22* (2013.01); *H04L 51/04* (2013.01); *H04L 51/066* (2013.01); *H04L 51/34* (2013.01); *H04L 51/36* (2013.01)

(58) Field of Classification Search
CPC ......... H04L 51/22; H04L 51/32; H04L 51/34; H04L 51/066; H04L 51/04; H04L 51/36
See application file for complete search history.

(56) References Cited

U.S. PATENT DOCUMENTS

| | | | | | |
|---|---|---|---|---|---|
| 5,930,471 | A | * | 7/1999 | Milewski | H04L 51/34 709/204 |
| 6,108,688 | A | * | 8/2000 | Nielsen | G06Q 10/107 709/206 |
| 7,921,174 | B1 | * | 4/2011 | Denise | G06Q 10/107 709/206 |
| 8,056,132 | B1 | * | 11/2011 | Chang | G06F 21/552 713/187 |
| 8,117,080 | B1 | * | 2/2012 | Ban | G06Q 30/0207 705/26.1 |
| 2002/0099775 | A1 | * | 7/2002 | Gupta | G06Q 10/107 709/205 |
| 2004/0243679 | A1 | * | 12/2004 | Tyler | G06Q 10/107 709/206 |
| 2004/0249890 | A1 | * | 12/2004 | Fellenstein | H04L 51/24 709/206 |

(Continued)

*Primary Examiner* — Aaron N Strange
(74) *Attorney, Agent, or Firm* — Cooper Legal Group, LLC

(57) ABSTRACT

One or more computing devices, systems, and/or methods for controlling a graphical user interface based upon a predicted messaging action of a messaging account are provided. For example, a plurality of messages associated with the messaging account may be received. Interactions with the plurality of messages may be tracked to generate sets of message interactions. The plurality of messages may be analyzed to identify sets of attributes. An expected action model may be generated based upon the sets of message interactions and the sets of attributes. Performance of a messaging action by a time threshold may be predicted based upon the expected action model. In response to a determination that the messaging action has not been performed by the time threshold, a reminder data structure may be generated. A graphical user interface may be controlled using the reminder data structure.

20 Claims, 13 Drawing Sheets

(56) References Cited

U.S. PATENT DOCUMENTS

| | | | |
|---|---|---|---|
| 2006/0041632 A1* | 2/2006 | Shah | G06F 16/48 709/217 |
| 2007/0078886 A1* | 4/2007 | Rivette | G06Q 10/10 |
| 2007/0245245 A1* | 10/2007 | Blue | G06Q 10/10 715/739 |
| 2008/0104235 A1* | 5/2008 | Oliver | H04L 29/12066 709/224 |
| 2008/0127345 A1* | 5/2008 | Holtmanns | H04L 51/12 726/23 |
| 2008/0280644 A1* | 11/2008 | Hugot | H04L 63/0853 455/556.2 |
| 2009/0106365 A1* | 4/2009 | Drory | G06Q 10/107 709/206 |
| 2009/0276506 A1* | 11/2009 | Tiwari | G06F 17/248 709/220 |
| 2013/0176865 A1* | 7/2013 | Boland | H04L 47/2483 370/252 |
| 2014/0143312 A1* | 5/2014 | Stockton | G06Q 30/0241 709/203 |
| 2014/0143683 A1* | 5/2014 | Underwood, IV | H04L 51/38 715/752 |
| 2014/0274171 A1* | 9/2014 | Cooper | H04W 4/12 455/466 |
| 2014/0280236 A1* | 9/2014 | Faller | H04L 51/32 707/749 |
| 2015/0142896 A1* | 5/2015 | Buchanan | H04L 51/02 709/206 |
| 2015/0200892 A1* | 7/2015 | Ramachandran | G06Q 10/109 709/206 |
| 2015/0200895 A1* | 7/2015 | Ding | H04L 51/34 709/206 |
| 2015/0200906 A1* | 7/2015 | Ganesh | H04L 51/34 709/206 |
| 2016/0112363 A1* | 4/2016 | Jackson | H04L 51/32 709/206 |
| 2017/0140048 A1* | 5/2017 | Wang | G06Q 10/02 |
| 2017/0236070 A1* | 8/2017 | Xu | G06N 20/00 706/12 |
| 2017/0310625 A1* | 10/2017 | Hu | G06F 16/24578 |
| 2017/0359291 A1* | 12/2017 | Qadir | G06F 17/2785 |
| 2018/0006989 A1* | 1/2018 | Dotan-Cohen | H04L 51/04 |
| 2018/0026923 A1* | 1/2018 | Cho | G06F 3/04842 709/206 |
| 2018/0198747 A1* | 7/2018 | Bastide | H04L 12/1863 |
| 2018/0219810 A1* | 8/2018 | Santos Ramirez | H04L 51/14 |
| 2018/0309708 A1* | 10/2018 | Potvin | H04L 51/22 |
| 2019/0014070 A1* | 1/2019 | Mertvetsov | H04L 51/046 |
| 2019/0147405 A1* | 5/2019 | Kobayashi | G06Q 10/107 |
| 2019/0258617 A1* | 8/2019 | Hsu | G06F 16/22 |
| 2019/0313054 A1* | 10/2019 | Harrison | G06F 3/165 |

* cited by examiner

CONTROLLING A GRAPHICAL USER INTERFACE BASED UPON A PREDICTION OF A MESSAGING ACTION OF A MESSAGING ACCOUNT

BACKGROUND

Many services, such as instant messaging services, email services, social networks and/or apps may allow a user to create an account capable of sending and receiving messages, such as an email account. The account may be presented via a graphical user interface, which may be used by the user to view, determine a significance of and/or act upon received messages. For example, the user may read, archive, delete, ignore, reply to, and/or forward a received message.

SUMMARY

In accordance with the present disclosure, one or more computing devices and/or methods for controlling a graphical user interface based upon a predicted messaging action of a messaging account are provided. In an example, a plurality of messages comprising a first message and a second message, associated with a messaging account, may be received. Interactions with the plurality of messages may be tracked to generate a first set of message interactions for the first message and a second set of message interactions for the second message. The plurality of messages may be analyzed to identify a first set of attributes for the first message and a second set of attributes for the second message. An expected action model may be generated based upon the first set of message interactions, the second set of message interactions, the first set of attributes and/or the second set of attributes. Performance of a messaging action by a time threshold may be predicted based upon the expected action model. In response to a determination that the messaging action has not been performed by the time threshold, a reminder data structure may be generated. A graphical user interface may be controlled using the reminder data structure.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
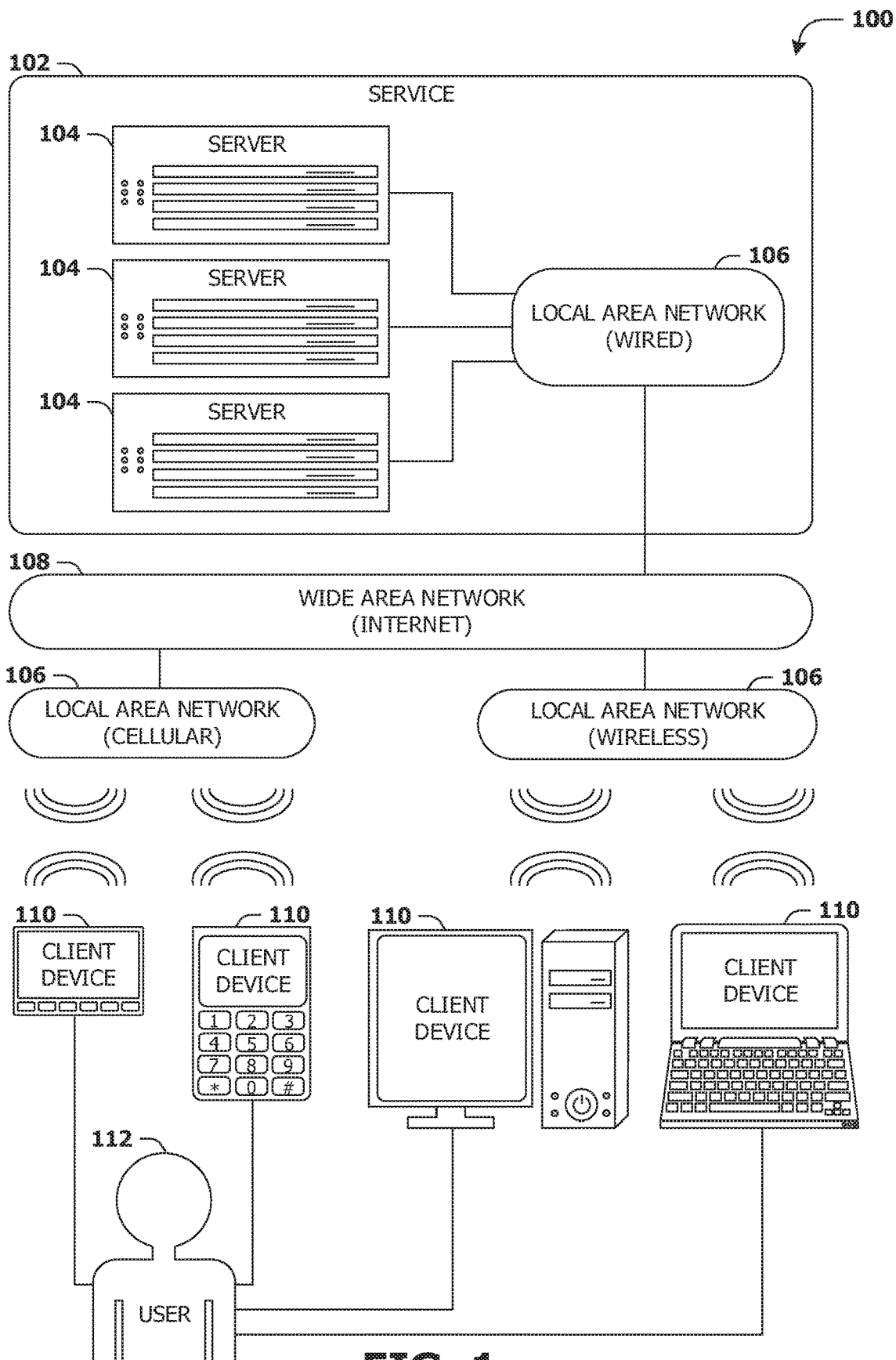
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
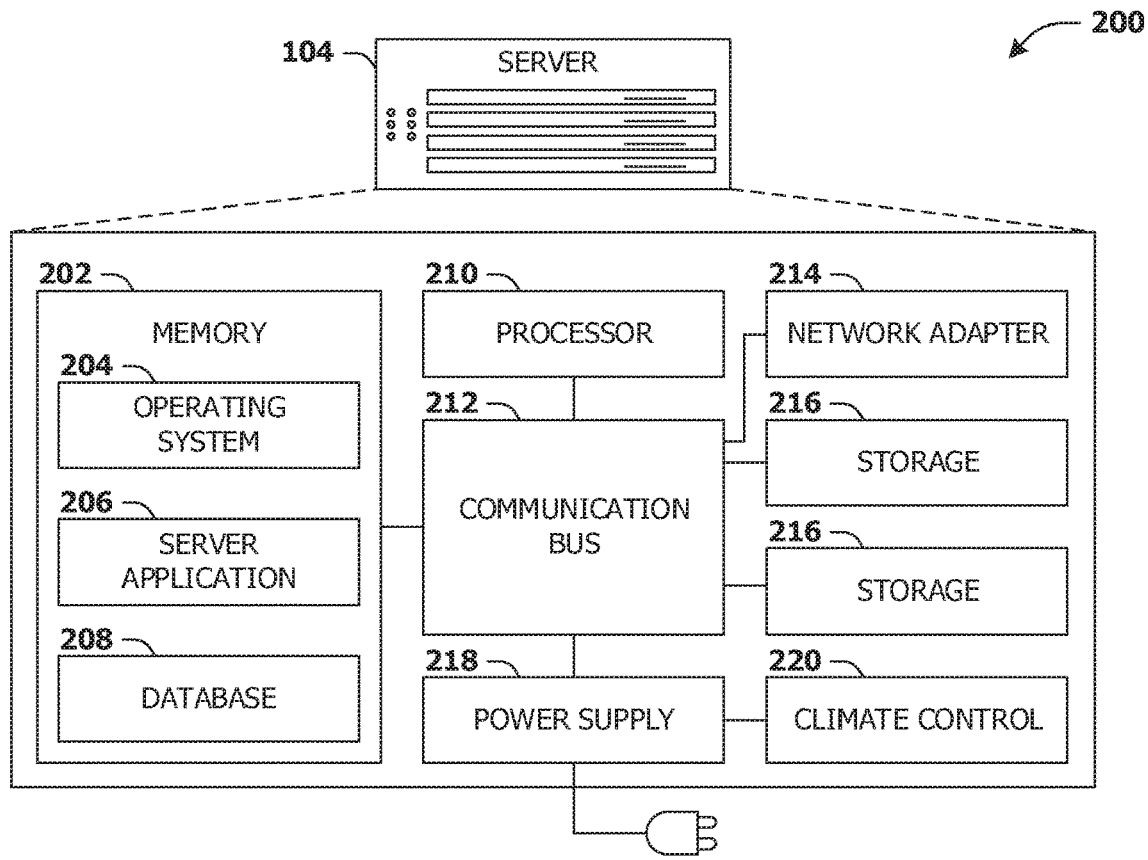
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
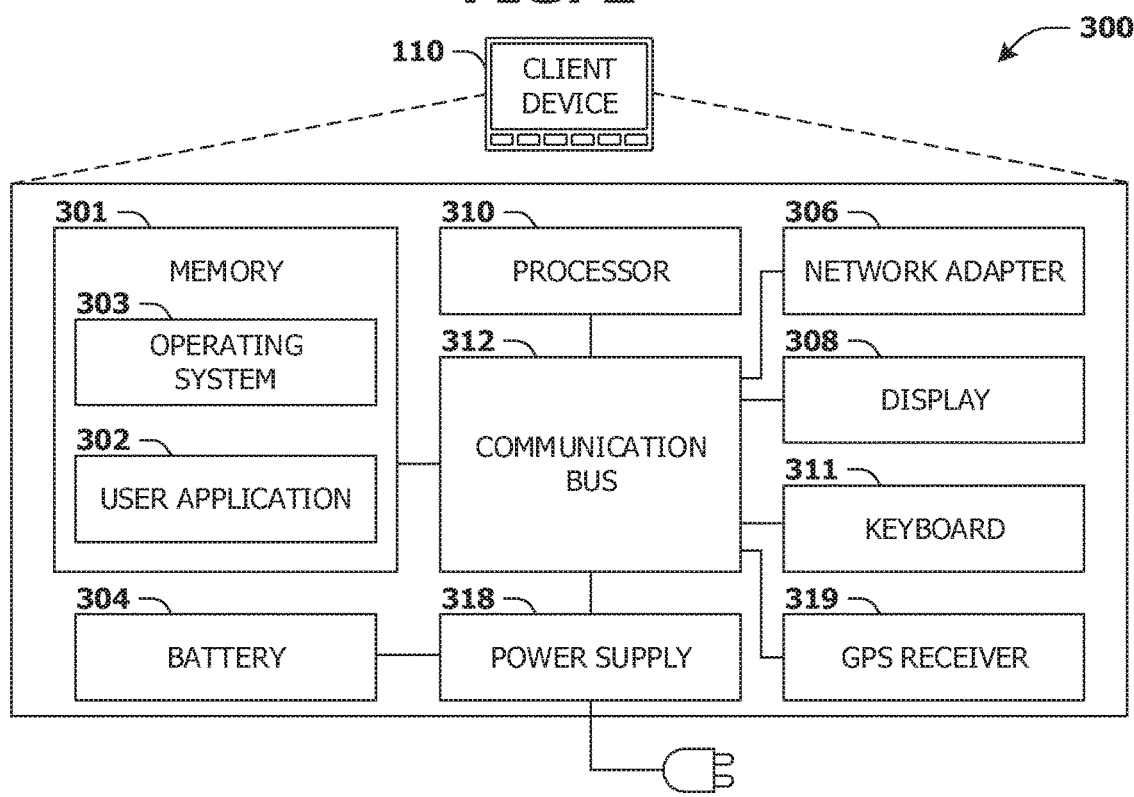
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for controlling a graphical user interface based upon a predicted messaging action of a messaging account are provided. For example, a user may have a messaging account (e.g., such as an email account, an instant messaging account, a social network account, a phone call account, a fax account, a video call account, etc.). A plurality of messages (e.g., email messages, instant messages, social network messages/posts, (e.g., logs and/or transcripts of) phone calls, faxes, video calls, etc.), associated with the messaging account, may be received (e.g., by a server and/or a client device of the user). The user may want to view and/or interact with (e.g., reply, forward, etc.) the plurality of messages via one or more interfaces on the client device (e.g., such as an email client, a browser, an app, or another interface on the client device).

Viewing (e.g., and/or reading) (e.g., each of) the plurality of messages (e.g., and/or information about the messages), determining a significance of (e.g., each of) the plurality of messages and/or acting upon (e.g., each of) the plurality of messages may requiring selecting each message from a list/folder of messages, interacting with each message, returning to the list/folder of messages, and then proceeding to a next message, and thus may consume a significant amount of time and/or resources of the client device. Additionally, a user may view a message and desire to reply to reply to the message at a future time (e.g., upon gaining access to one or more resources), but in conventional systems, the message may progressively be pushed down in an inbox as new messages are received. Thus, over time, in conventional systems, the message that the user desires to reply to may not be visually accessible, and the client device may be required to use an excessive amount of hardware resources (e.g., processor power) to retrieve the message, such as processing input for a search for the message, scanning a database of messages, identifying the message as matching the search, and presenting the message for further interaction. Alternatively and/or additionally, resources of the client device may be occupied with presenting the user with other messages/functions, and the client device may thus cause the user to forget and/or otherwise fail to satisfy the intention to interact with the message in conventional systems.

Thus, in accordance with one or more of the techniques presented herein, interactions with the plurality of messages and sets of attributes of the plurality of messages may be used to generate an expected action model, which may be used to predict performance of a messaging action by a time threshold, and a graphical user interface may be controlled based upon the prediction. For example, the graphical user interface may be controlled in a manner that distinguishes the message that the user intends to interact with (e.g., reply, forward, etc.) from one or more other messages (e.g., if the interaction was not detected by a time threshold). Thus, in accordance with one or more of the techniques presented herein, the desired messaging action may be performed with greater speed (e.g., as the client device graphically presents the desired message and/or the desired messaging action at a desirable time) and improved accuracy (e.g., as the client device decreases the probability of the desired messaging action being forgotten). Accordingly, the controlling of the graphical user interface (e.g., and/or one or more other actions) described herein improves the speed, accuracy and usability of computer displays.

Figure 4:
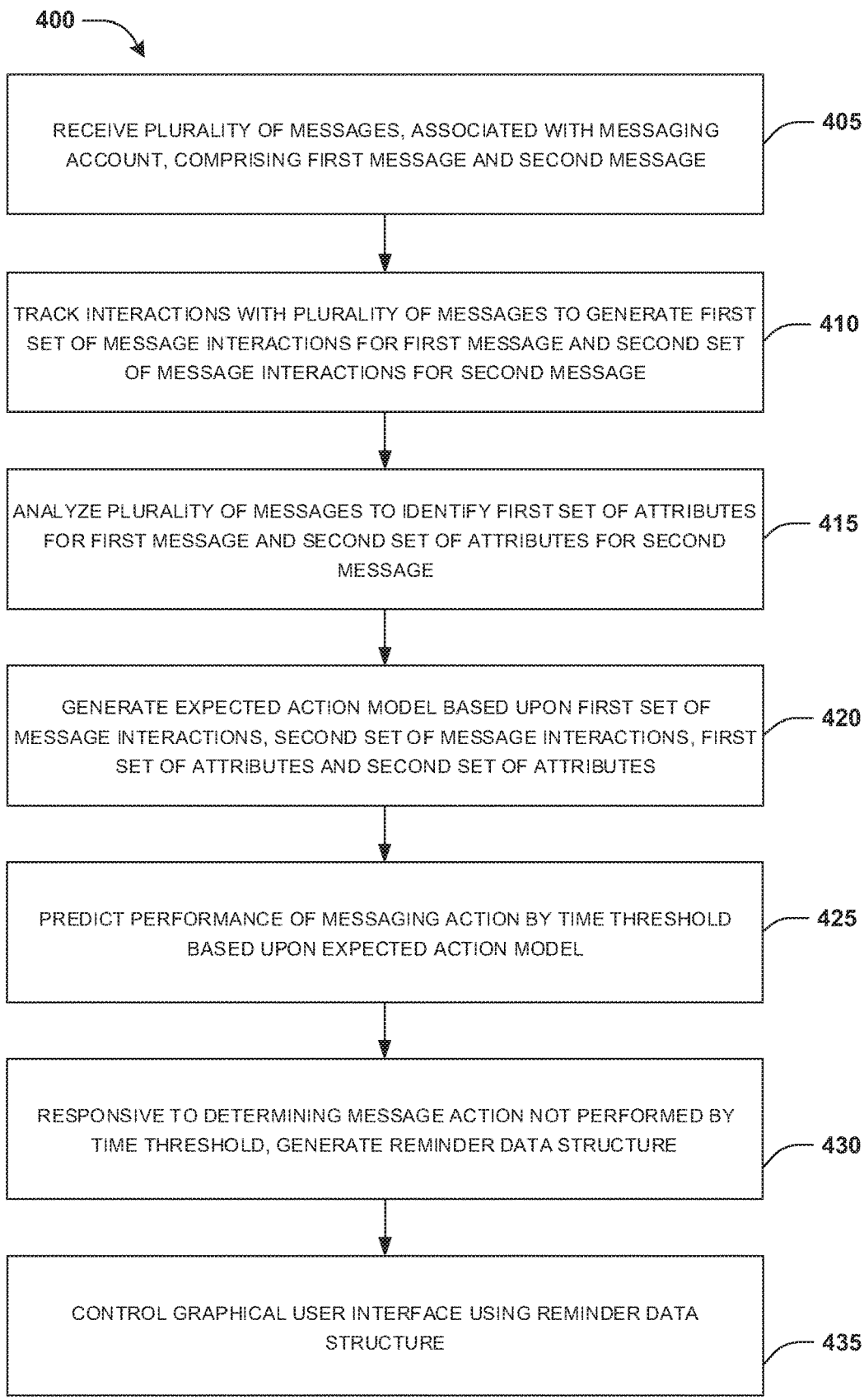
FIG. 4 is a flow chart illustrating an example method for controlling a graphical user interface based upon a predicted messaging action of a messaging account.

An embodiment of controlling a graphical user interface based upon a predicted messaging action of a messaging account is illustrated by an example method 400 of FIG. 4. In some examples, the messaging account may comprise an email account. A user, such as user Jill, (e.g., and/or a client device) may access and/or interact with a service for sending and receiving messages, such as an email service, an instant messaging service, a social network, an app, etc. The messaging account of the user with the service may be accessed and/or interacted with via one or more interfaces on the client device, such as an email client, a browser, an app, or another interface on the client device. Accordingly, at 405, a plurality of messages comprising a first message and a second message, associated with the messaging account, may be received (e.g., by a server and/or the client device) (e.g., via an email client, via a browser, via an app, via a social network, via an instant messaging service, via a phone call service, via a video call service, via a fax service, etc.). The plurality of messages may be stored in one or more databases for the messaging account, such as a first database for an inbox (e.g., and/or log of incoming communications) of the messaging account, a second database for a sent box (e.g., and/or log of outgoing communications) of the messaging account, etc.

At 410, interactions with each message of the plurality of messages may be tracked (e.g., by the server and/or the client device) to generate a set of message interactions for each message of the plurality of messages. For example, interactions with the first message may be tracked to generate a first set of message interactions for the first message and/or interactions with the second message may be tracked to generate a second set of message interactions for the second message. Interactions may include opening a message, replying to a message, forwarding a message, sharing a message (e.g., via a social media feed, a blog, etc.), ignoring a message, not opening a message (e.g., even after a portion of the message is displayed), deleting a message, marking a message as spam, associating a message with a label and/or folder, etc.

At 415, the plurality of messages may be analyzed (e.g., scanned) to identify a set of attributes for each message of the plurality of messages. For example, the first message may be analyzed to identify (e.g., and/or extract) a first set of attributes for the first message and/or the second message may be analyzed to identify (e.g., and/or extract) a second set of attributes for the second message. Attributes identified for a message may include content and/or metadata of the message, such as a sender (e.g., name, address, username, etc.) of a message, a recipient (e.g., name, address, username, etc.) of a message, a subject of a message, a body of a message, a time of an interaction (e.g., opening, replying, forwarding, sharing, ignoring, not opening, deleting, marking as spam, associating with label/folder, etc.) with a message, a time of receipt of a message, portions of a header of a message, a topic/category determined to be associated with a message, and/or a domain associated with (e.g., a sender, a recipient, a reply-to address, etc. of) a message.

At 420, an expected action model may be generated based upon the set of message interactions for each message of the plurality of messages and the set of attributes for each message of the plurality of messages. For example, the expected action model may be generated based upon the first set of message interactions for the first message, the second set of message interactions for the second message, the first set of attributes for the first message and/or the second set of attributes for the second message. The expected action model may indicate probabilities and/or correlations between one or more attributes of messages and/or one or more interactions. For example, the expected action model may indicate that messages with a first attribute tend to be replied to within a first amount of time, while messages with a second attribute tend to be forwarded within a second amount of time, and while messages with a third attribute tend to be ignored.

In some examples, the expected action model may be customized for a (e.g., single) user and/or messaging account, while in other examples, the expected action model may be global and/or used for a plurality of users. In some examples, the expected action model may be customized for a particular set of users, such as employees of a company, while in other examples, the expected action model may be further customized for subsets of the set of users, such as engineers at the company. In some examples, the expected action model used for a user may be combination of a user-specific expectation model generated for the user's messaging account and one or more global expectation models generated for a plurality of users, a set of users, a subset, etc.

At 425, performance of a messaging action by a time threshold may be predicted based upon the expected action model. For example, a third message associated with the messaging account may be received, and a prediction may be made, using the expected action model, that a reply message to the third message is likely to be generated and transmitted (e.g., to a sender of the third message, to a co-recipient of the third message, to a different user, etc.) by the time threshold (e.g., within 3 days (e.g., of receiving the third message, of viewing the third message, etc.)). In another example, the third message associated with the messaging account may be received, and a prediction may be made, using the expected action model, that a forward message for the third message is likely to be generated and transmitted (e.g., to a co-recipient of the third message, to a different user, etc.) by the time threshold (e.g., within 5 days).

Alternatively and/or additionally, one or more actions that caused the receiving the first message may be determined based upon the expected action model. For example, content and/or metadata of the first message may be scanned to determine that the first message includes a receipt and/or confirmation of payment from a telecommunications company, includes (e.g., bank, credit, etc.) account information associated with the user of the messaging account and/or is addressed to the user of the messaging account. Thus, a determination may be made that the action of making a payment for a (e.g., cell phone) bill caused the first message to be received. A prediction may be made, using the expected action model, that a third message with one or more similarities to the first message (e.g., common content (e.g., confirmation language, payment information, etc.), common metadata, etc.) is likely to be received (e.g., from a sender of the first message, to a co-recipient of the first message, from a different user, etc.) by the time threshold (e.g., within 1 month).

At 430, in response to determining that the messaging action has not been performed by the time threshold, a reminder data structure may be generated. For example, where the prediction was made that the reply message to the third message is likely to be generated and transmitted by the time threshold, the reminder data structure may be generated to include a reminder to generate and/or transmit the reply message. In the example where the prediction was made that the forward message to the third message is likely to be generated and transmitted by the time threshold, the reminder data structure may be generated to include a reminder to generate and/or transmit the forward message. In the example where the prediction was made that the third message with one or more similarities to the first message is likely to be received by the time threshold, the reminder data structure may be generated to include a reminder to perform (e.g., an iteration of) the one or more actions determined to have caused the receiving the first message and/or to include an indication of the determination that the messaging action has not been performed by the time threshold.

In some examples, the reminder data structure may be generated without necessitating the determination that the message action was not performed by the time threshold and/or may be stored (e.g., with an identifier, time threshold, etc. of the corresponding message(s)) in a database and/or index that includes one or more reminder data structures associated with the messaging account of the user. The reminder data structures in the database and/or index may be monitored (e.g., in real-time/live, periodically, etc.) to determine when a time threshold of one or more reminder data structures has arrived. Alternatively and/or additionally, the corresponding message(s) (e.g., the received third message for which a reply/forward is predicted, the received first message for which receipt of a similar third message is predicted, etc.) may be tagged with the reminder data structure (e.g., as metadata). When a predicted messaging action is determined to have been performed, the reminder data structure may be removed from the database and/or index, and/or untagged from the corresponding message(s).

At 435, a graphical user interface may be controlled using the reminder data structure. For example, the graphical user interface may be controlled to display one or more portions of the reminder data structure, such as a reminder to perform the messaging action that was predicted to be performed. The controlling of the graphical user interface may cause a computer display of the client device (e.g., and/or one or more other client devices) to highlight the corresponding message(s) (e.g., one or more messages associated with the messaging action), such that the corresponding message(s) are visually distinguished from one or more other messages (e.g., that are not associated with the messaging action). Thus, the controlling the graphical user interface enables the desired messaging action to be performed with greater speed and improved accuracy, and thereby improves the speed, accuracy and usability of computer displays.

In some examples, the user may not desire to perform the messaging action, may desire to perform a different messaging action instead and/or may desire to perform the messaging action at a later time. The graphical user interface may thus be controlled to further display a first graphical object that corresponds to the desire to not perform the messaging action, a second graphical object that corresponds to the desire to perform the different messaging action (e.g., selected from a drop-down menu) and/or a third graphical object that corresponds to the desire to perform the messaging action at the later time (e.g., selected via a text input box and/or a drop-down menu). The reminder data structure may be modified based upon selection of the first graphical object, the second graphical object and/or the third graphical object. If the first graphical object is selected, the client device may no longer provide visual indications of the messaging action. If the second graphical object is selected, the client device may provide visual indications of the different messaging action. If the third graphical object is selected, the client device may provide visual indications of the messaging action at the later time.

In some examples, the expected action model may be continuously improved and/or updated based upon messages received and/or sent by the messaging account and/or interactions with the messages. For example, a new set of messages may be received in association with the messaging account. Interactions with the new set of messages may be tracked to generate a set of message interactions for each message of the new set of messages. The new set of messages may be analyzed to identify a set of attributes for each message of the new set of messages. The expected action model may be modified based upon the sets of message interactions generated for the new set of messages and the sets of attributes identified for the new set of messages.

In some examples, the user (e.g., or a manager, administrator, etc.) may want to access a visualization of one or more messaging actions predicted for the messaging account (e.g., and/or one or more assumptions, correlations, etc. of the expected action model). A request for a list of messaging actions predicted for the messaging account (e.g., and/or the one or more assumptions, correlations, etc.) may be received via the client device (e.g., and/or another client device). Based upon the request, a messaging action data structure comprising the list of messaging actions (e.g., and/or the one or more assumptions, correlations, etc.) may be generated. The graphical user interface may be controlled using the messaging action data structure. For example, the controlling the graphical user interface may cause the computer display to graphically present the list of messaging actions (e.g., and/or the one or more assumptions, correlations, etc.) and/or distinguish the list of messaging actions from one or more other graphical objects.

Figure 5:
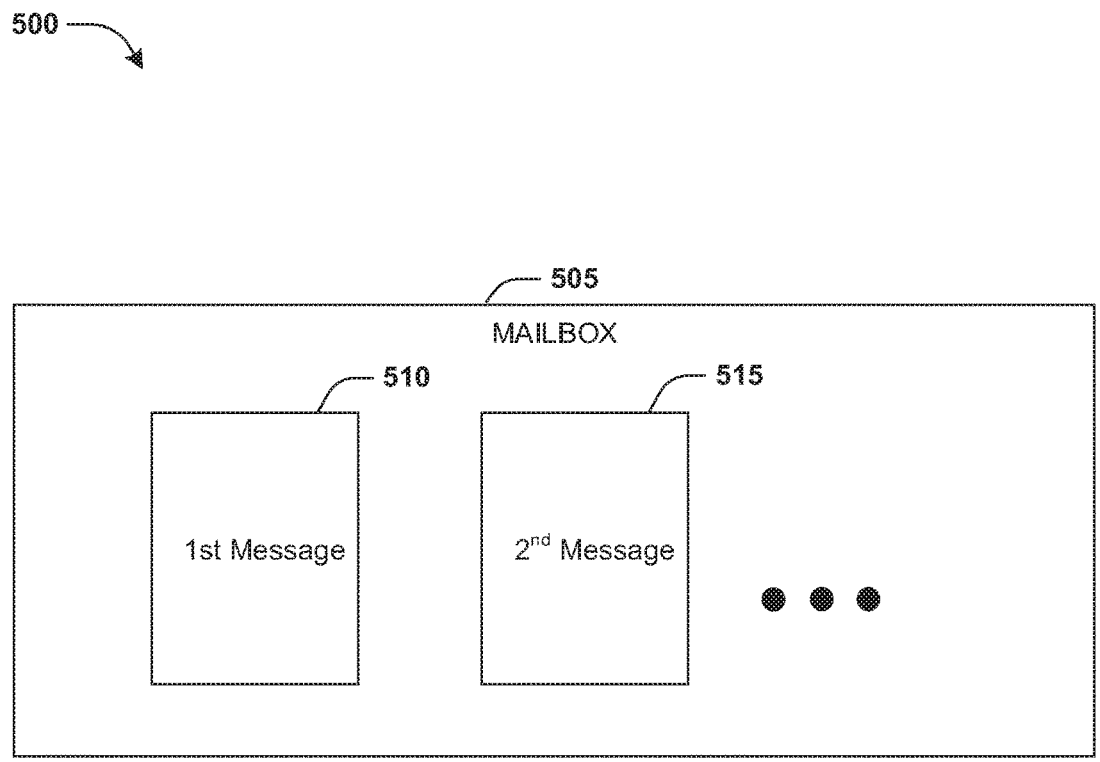
FIG. 5 is a component block diagram illustrating an example system for controlling a graphical user interface based upon a predicted messaging action of a messaging account.
Figure 6:
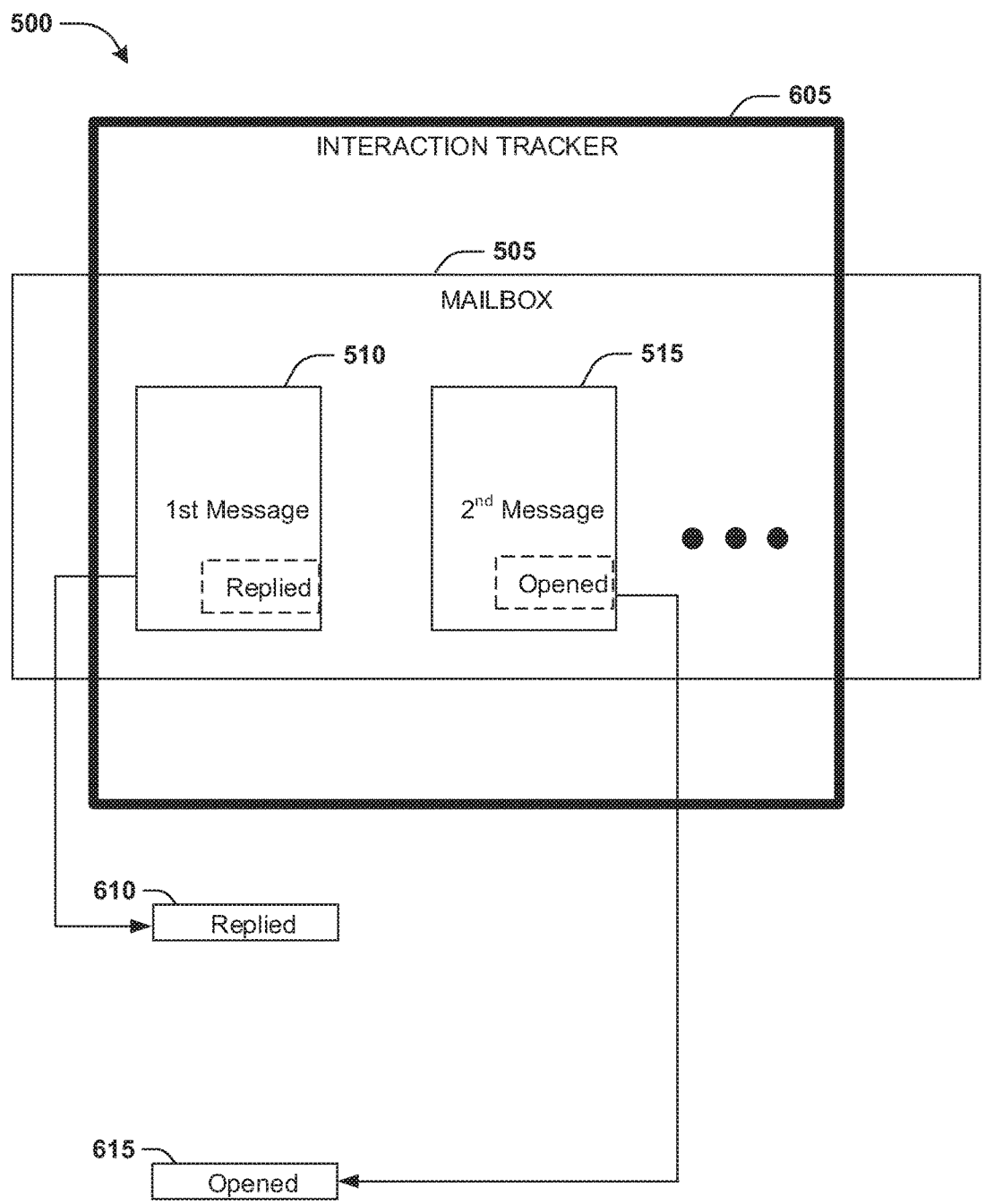
FIG. 6 is a component block diagram illustrating an example system for controlling a graphical user interface based upon a predicted messaging action of a messaging account.

FIG. 5 illustrates a system 500 for controlling a graphical user interface based upon a predicted messaging action of a messaging account. The system 500 may receive a first message 510, a second message 515, and/or one or more other messages in a mailbox 505. As illustrated in FIG. 6, the system 500 may include an interaction tracker 605, which may be configured to track interactions with messages in the mailbox 505 and generate a set of message interactions for each message in the mailbox 505. The interaction tracker 605 may track the first message 510 to determine that the first message 510 was replied to, and may generate a first message interaction 610 indicating the reply. The interaction tracker 605 may track the second message 515 to determine that the second message 515 was opened, and may generate a second message interaction 615 indicating the opening.

Figure 7:
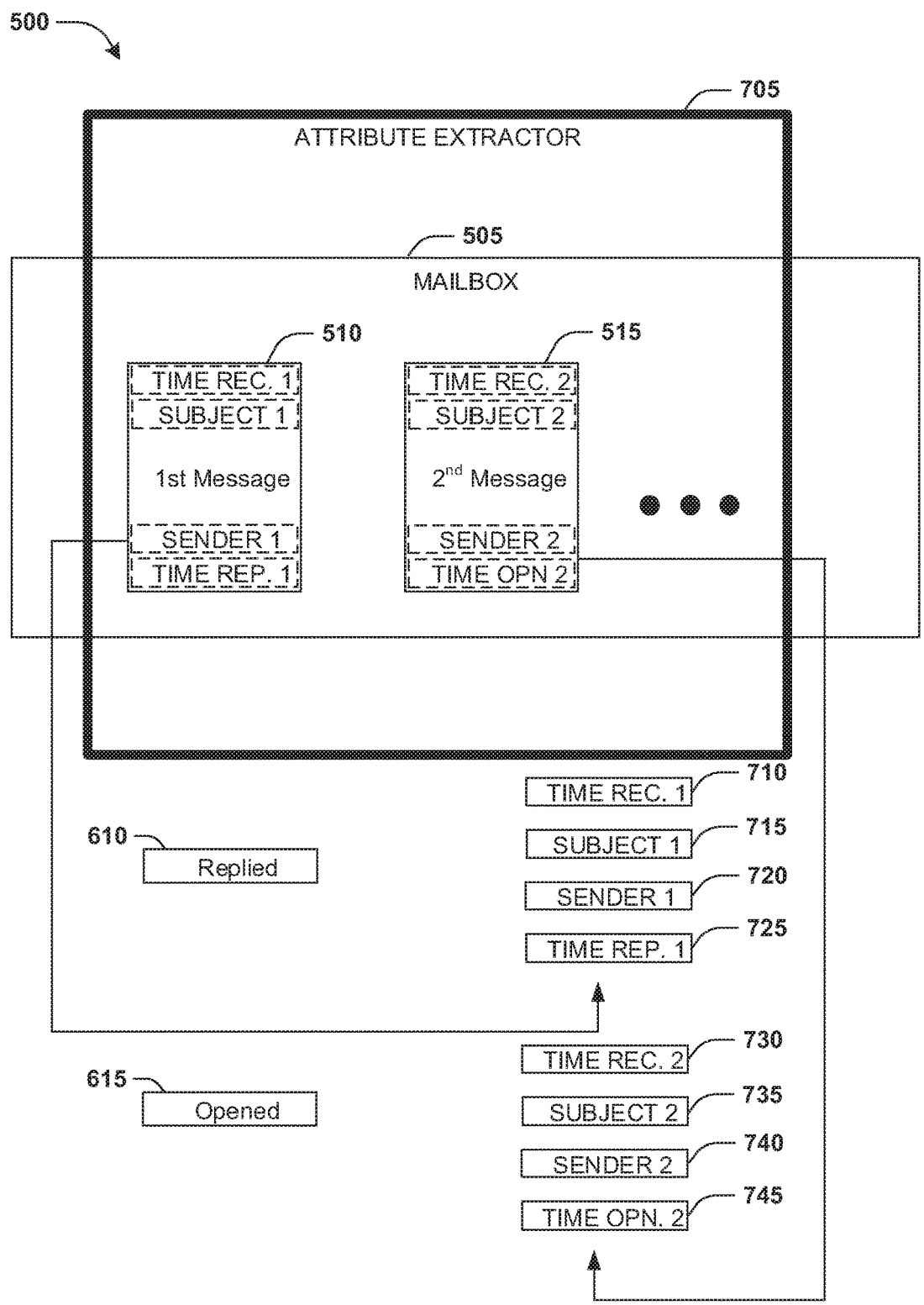
FIG. 7 is a component block diagram illustrating an example system for controlling a graphical user interface based upon a predicted messaging action of a messaging account.

As illustrated in FIG. 7, the system 500 may include an attribute extractor 705, which may be configured to analyze messages in the mailbox 505 and identify and/or extract attributes for each message in the mailbox 505. The attribute extractor 705 may analyze the first message 510 to determine that the first message 510 was received at a first time, has a first subject, was sent by a first sender, and/or was replied to at a first reply time. The attribute extractor 705 may generate a first attribute 710 indicating the first time, a second attribute 715 indicating the first subject, a third attribute 720 indicating the first sender and/or a fourth attribute 725 indicating the first reply time. The attribute extractor 705 may analyze the second message 515 to determine that the second message 515 was received at a second time, has a second subject, was sent by a second sender, and/or was opened at a second open time. The attribute extractor 705 may generate a fifth attribute 730 indicating the second time, a sixth attribute 735 indicating the second subject, a seventh attribute 740 indicating the second sender and/or an eighth attribute 745 indicating the second open time.

Figure 8:
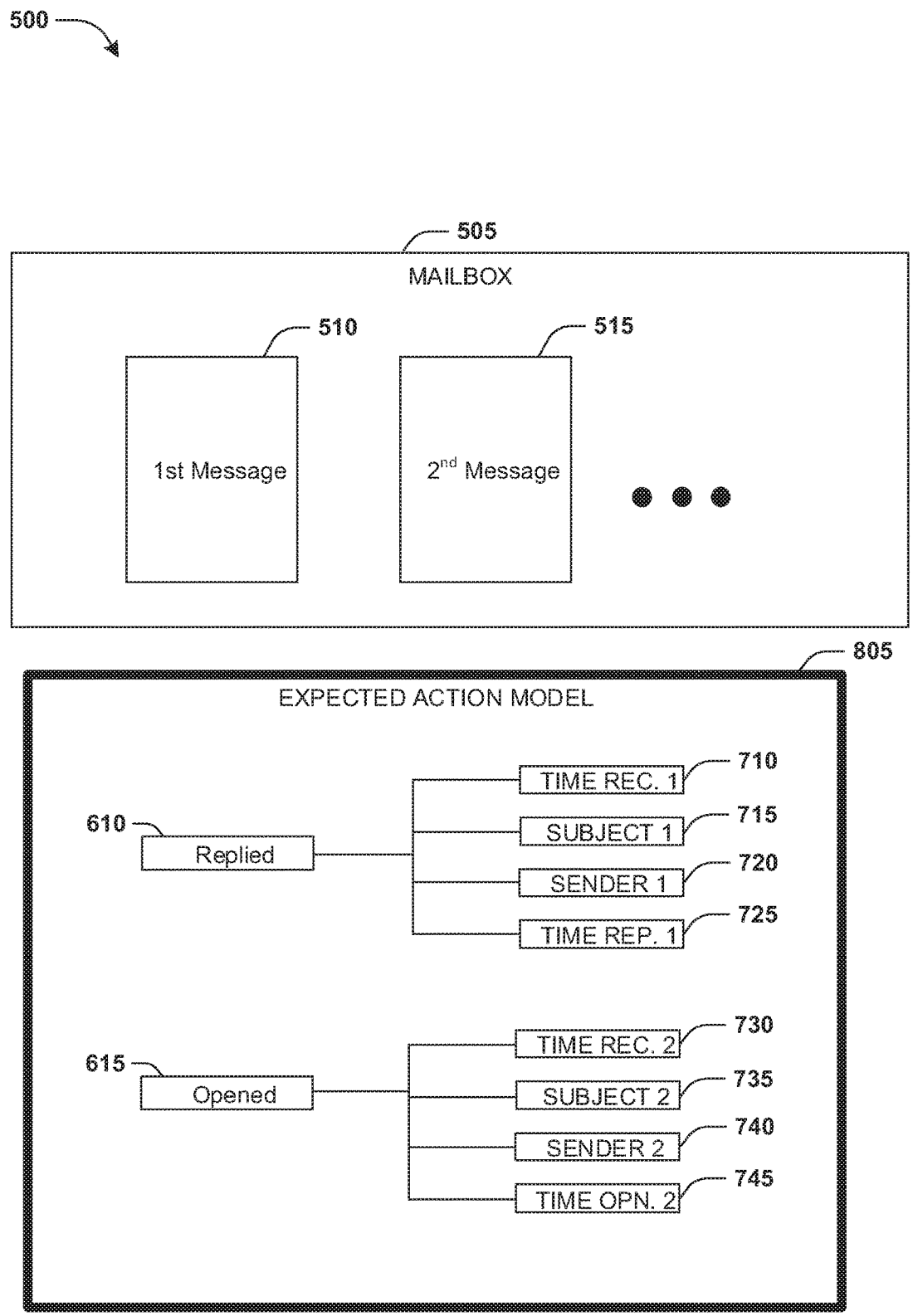
FIG. 8 is a component block diagram illustrating an example system for controlling a graphical user interface based upon a predicted messaging action of a messaging account.

As illustrated in FIG. 8, the system 500 may use one or more of the interactions generated by the interaction tracker 605 and/or the attributes extracted and/or generated by the attribute extractor 705 to generate an expected action model 805. The expected action model 805 may indicate one or more connections, relationships, correlations, etc. between one or more interactions and/or one or more attributes of messages of the mailbox 505.

For example, the expected action model 805 may indicate that a message with the first attribute 710 (e.g., the first time), the second attribute 715 (e.g., the first subject), the third attribute 720 (e.g., the first sender) may have a greater than threshold (e.g., average) probability of being interacted with based upon the first interaction 610 (e.g., being replied to) in accordance with the fourth attribute 725 (e.g., by the first reply time). Alternatively and/or additionally, the expected action model 805 may indicate that a message with the fifth attribute 730 (e.g., the second time), the sixth attribute 735 (e.g., the second subject), the third attribute 740 (e.g., the second sender) may have a greater than threshold (e.g., average) probability of being interacted with based upon the second interaction 615 (e.g., being opened) in accordance with the fourth attribute 745 (e.g., by the second open time).

Figure 9:
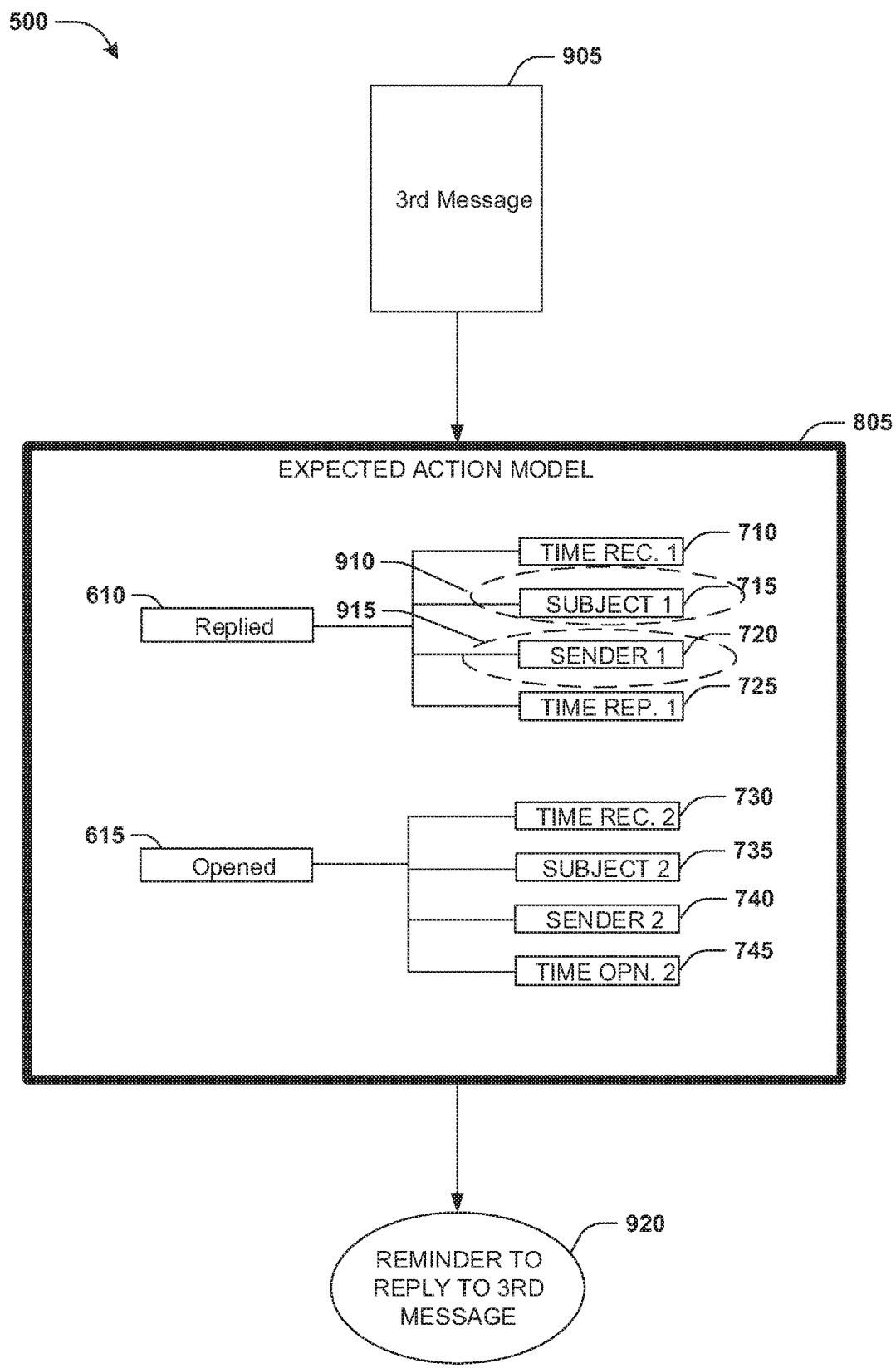
FIG. 9 is a component block diagram illustrating an example system for controlling a graphical user interface based upon a predicted messaging action of a messaging account.

As illustrated in FIG. 9, the system 500 may use the expected action model 805 to process a third message 905, which may be received in the mailbox 505 (e.g., after receiving the first message 510 and the second message 515 and/or after generating the expected action model 805). For example, the system 500 may scan the third message 905 and/or compare one or more portions of the third message 905 to one or more portions of the expected action model 805 to determine whether at least some of the third message 905 matches attributes used to build the expected action model 805.

The system 500 may identify a first match 910 of an attribute shared (e.g., and/or similar within a threshold) between the third message 905 and the expected action model 805. For example, the system 500 may determine that the third message 905 has the second attribute 715 that was generated based upon the first message 510 (e.g., the third message 905 may have a same and/or similar subject as the first message 510).

The system 500 may identify a second match 915 of an attribute shared (e.g., and/or similar within a threshold) between the third message 905 and the expected action model 805. For example, the system 500 may determine that the third message 905 has the third attribute 720 that was generated based upon the first message 510 (e.g., the third message 905 may have a same and/or similar sender/origin as the first message 510).

The system 500 may predict performance of a messaging action by a time threshold based upon the expected action model 805. For example, based upon the first match 910 and/or the second match 915, a determination may be made that, like the first message 510, the third message 905 is likely to be interacted with based upon the first interaction 610 (e.g., being replied to) in accordance with the fourth attribute 725 (e.g., by the first reply time).

The prediction for performance of the messaging action and/or the time threshold may be made based upon a determination that a threshold number of attributes (e.g., two or more) match the third message 905, based upon a determination that a level of similarity between the matches exceeds a threshold (e.g., the subjects are at least 60% the same in content and/or related in topic), based upon a determination that the number of attributes of the messaging action and/or the time threshold matching the third message 905 exceed the number of attributes of the number of attributes of one or more other messaging actions and/or the time thresholds matching the third message 905, etc. In some examples, the prediction for performance of the messaging action and/or the time threshold may be calculated based upon a combination of a plurality of attributes and/or interactions associated with (e.g., extracted from) a plurality of different messages. For example, if the third message 905 is determined to have a subject and a sender matching those of five previously processed messages, the third message may be predicted to perform the messaging action by a time threshold that is an average of the time thresholds associated with the five previously processed messages.

The system 500 may generate a reminder 920 based upon the predicted performance of the messaging action by the time threshold. The reminder 920 may include a reminder to reply to the third message 905 by the first reply time.

Figure 10:
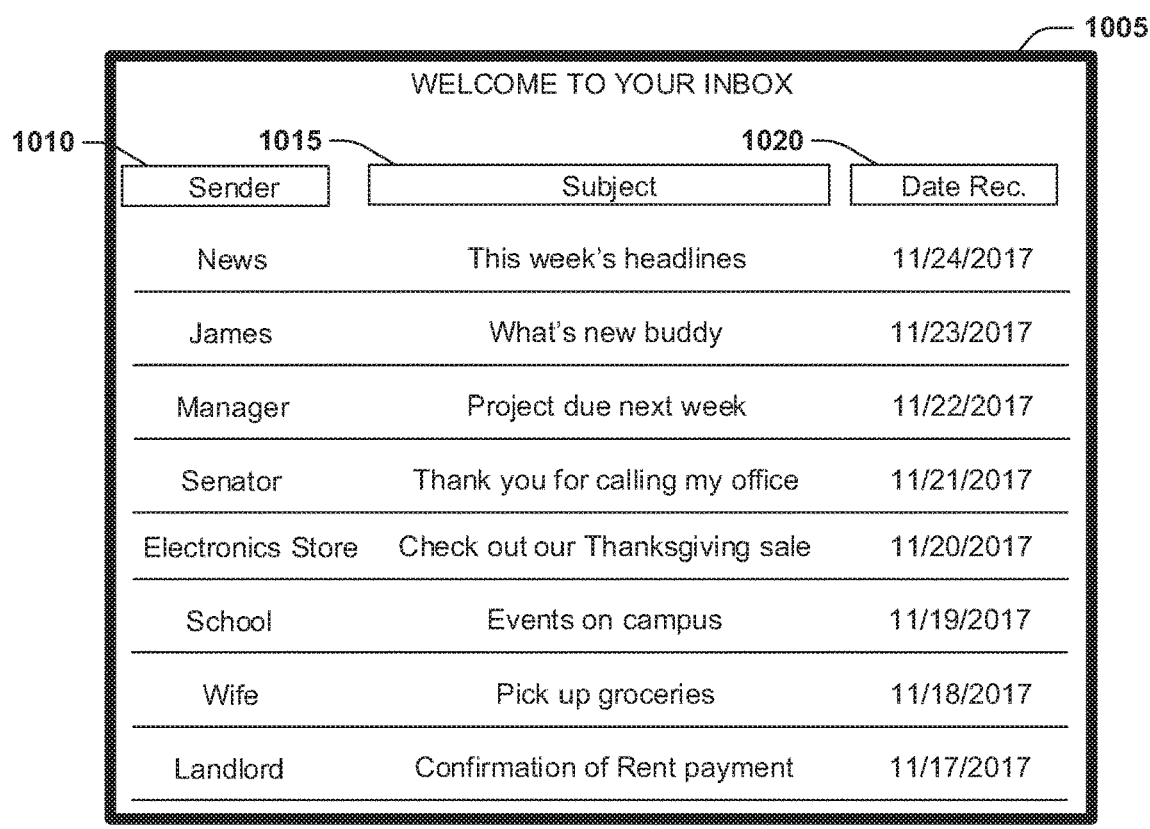
FIG. 10 is a component block diagram illustrating an example system for controlling a graphical user interface based upon a predicted messaging action of a messaging account.

As illustrated in FIG. 10, the system 500 may control a graphical user interface 1005 visually representing (e.g., an index of) at least some messages in the mailbox 505. The graphical user interface 1005 may graphically present an inbox or other portion of the messaging account, for example. The graphical user interface 1005 may display the messages organized based upon various attributes of the messages, such as a sender attribute 1010, a subject attribute 1015 and/or a date received attribute 1020.

Figure 11:
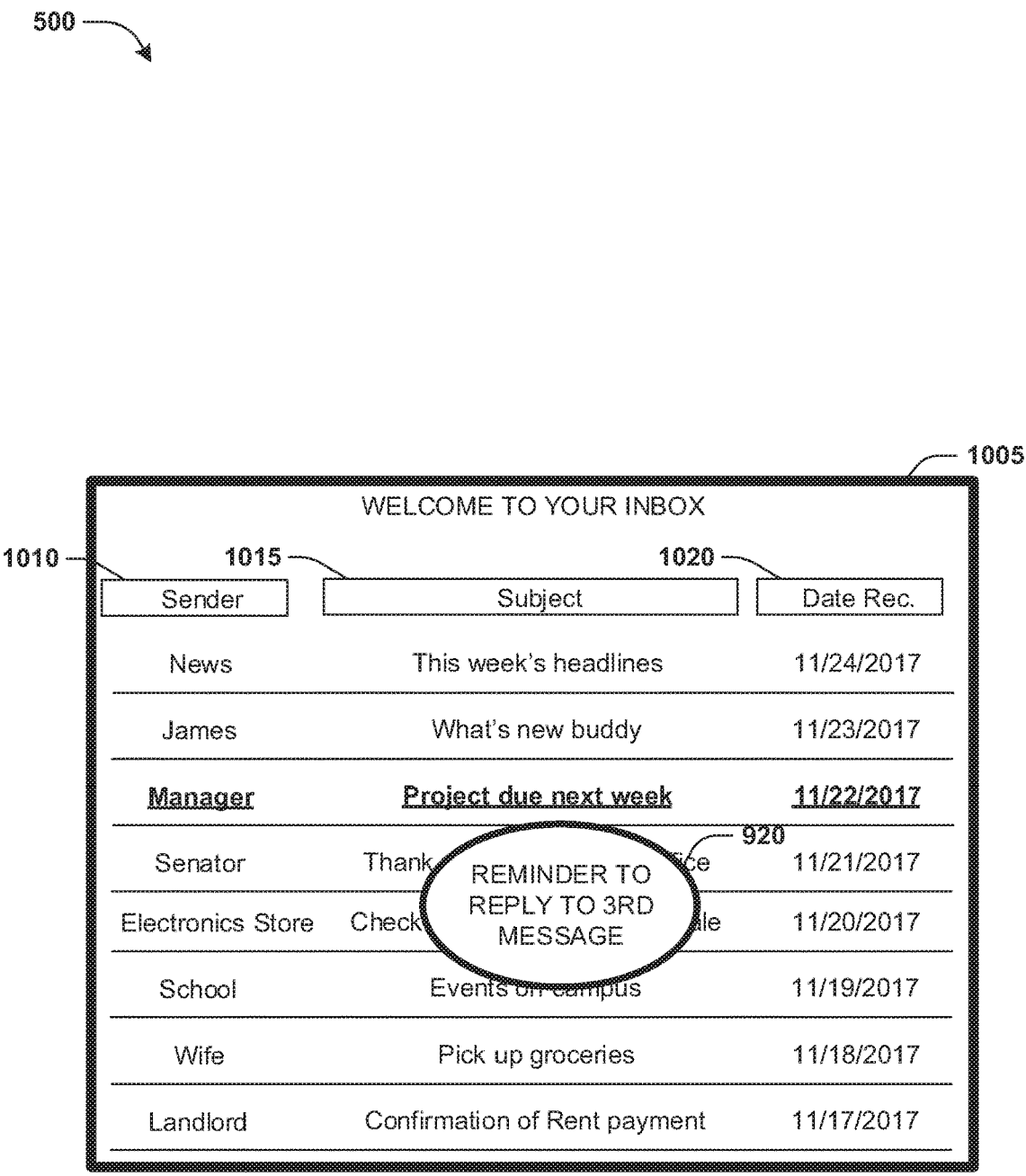
FIG. 11 is a component block diagram illustrating an example system for controlling a graphical user interface based upon a predicted messaging action of a messaging account.

As illustrated in FIG. 11, the system 500 may control the graphical user interface 1005 based upon the reminder 920. For example, the graphical user interface 1005 may visually display the reminder 920 concurrently with at least some messages in the mailbox 505 (e.g., when the time threshold is reached, or is within a threshold amount of time from being reached). The graphical user interface 1005 may highlight (e.g., via bolding, underling, coloring, animation, etc.) the representation of the third message 905 such that the third message 905 is visually distinguished from one or more other messages represented in the graphical user interface 1005. In some examples, based upon the reminder 920, the messages in the graphical user interface 1005 may be reordered such that the third message 905 is displayed above one or more other messages (e.g., which may have been received after the third message 905).

In some examples, the reminder 920 may include a graphical object indicative of an interface configured to enable performance of the messaging action. For example, if the messaging action predicted is to reply or forward, the graphical object may include an interface for writing and sending a reply or forward message. One or more fields of the drafted message may be automatically populated in the interface by the system 500. For example, the recipient field, the subject field and/or the body field of the drafted message may be predicted and populated based upon the attributes derived from the expected action model 805. The interface may be usable by the user to edit one or more of the fields, and then transmit the drafted message upon selection of a send input.

Figure 12:
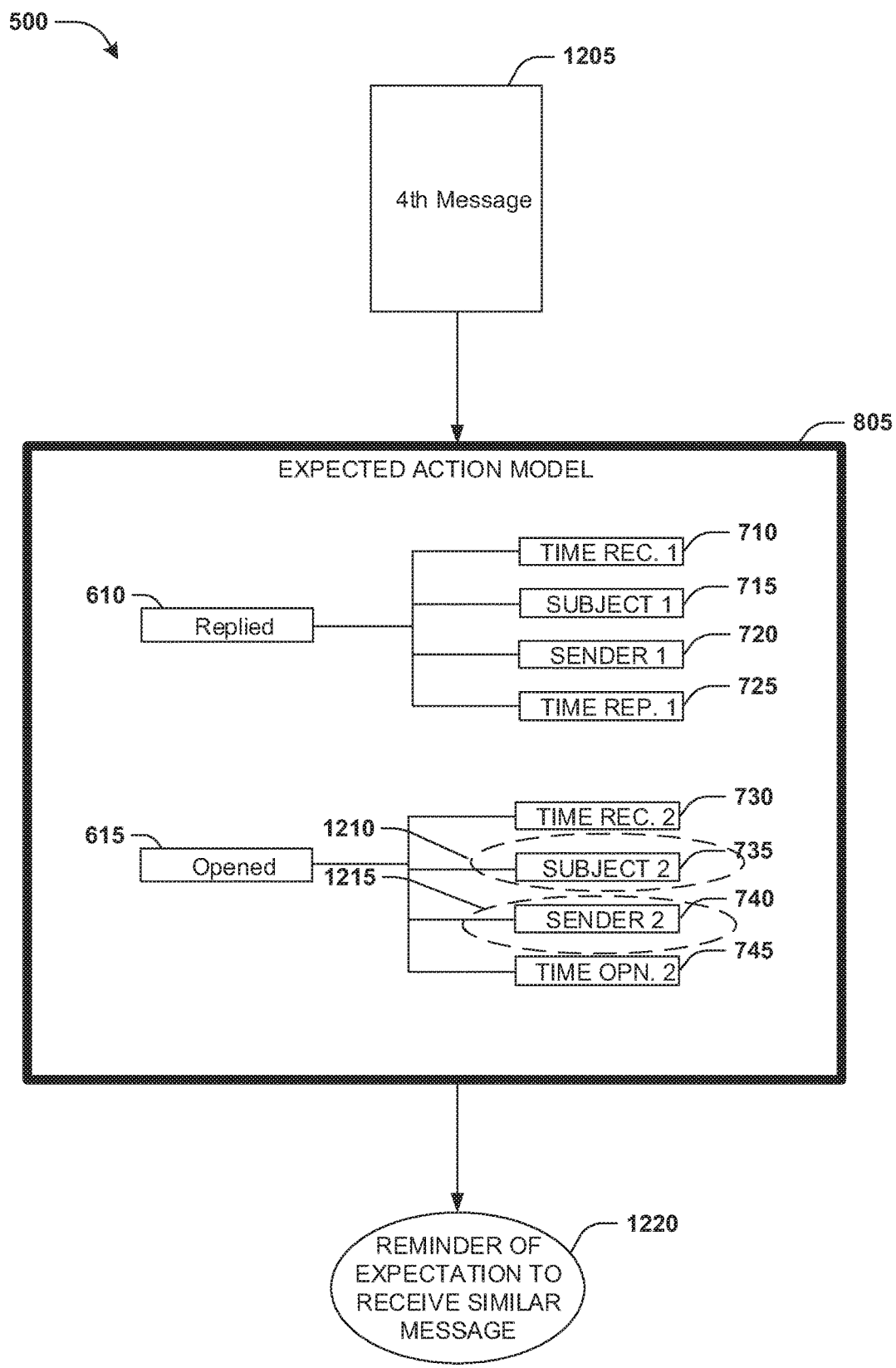
FIG. 12 is a component block diagram illustrating an example system for controlling a graphical user interface based upon a predicted messaging action of a messaging account.

As illustrated in FIG. 12, the system 500 may use the expected action model 805 to process a fourth message 1205 (e.g., confirmation of rent payment for the month of November), which may be received in the mailbox 505 (e.g., after receiving the first message 510 and the second message 515 and/or after generating the expected action model 805). For example, the system 500 may scan the fourth message 1205 and/or compare one or more portions of the fourth message 1205 to one or more portions of the expected action model 805 to determine whether at least some of the fourth message 1205 matches attributes used to build the expected action model 805.

The system 500 may identify a third match 1210 of an attribute shared (e.g., and/or similar within a threshold) between the fourth message 1205 and the expected action model 805. For example, the system 500 may determine that the fourth message 1205 has the sixth attribute 735 that was generated based upon the second message 515 (e.g., confirmation of rent payment for the month of October) (e.g., the fourth message 1205 may have a same and/or similar subject as the second message 515).

The system 500 may identify a fourth match 1215 of an attribute shared (e.g., and/or similar within a threshold) between the fourth message 1205 and the expected action model 805. For example, the system 500 may determine that the fourth message 1205 has the seventh attribute 740 that was generated based upon the second message 515 (e.g., the fourth message 1205 may have a same and/or similar sender/origin as the second message 515).

The system 500 may predict performance of a messaging action by a time threshold based upon the expected action model 805. For example, based upon the third match 1210 and/or the fourth match 1215, a determination may be made that a fifth message (e.g., confirmation of rent payment for the month of December) with one or more similarities to the fourth message 1205 (e.g., common content (e.g., confirmation language, payment information, etc.), common metadata, etc.) is likely to be received (e.g., from a sender of the fourth message 1205, to a co-recipient of the fourth message 1205, from a different user, etc.) in accordance with the fifth attribute 730 (e.g., by the second time).

The system 500 may generate a reminder 1220 based upon the predicted performance of the messaging action by the time threshold. The reminder 920 may include an indication that a fifth message similar to the fourth message 1205 has not been received yet and/or a reminder to perform (e.g., an iteration of) one or more actions determined to cause the receipt of the second message 515 and/or the fourth message 1205 to the third message 905 (e.g., by the second time).

Figure 13:
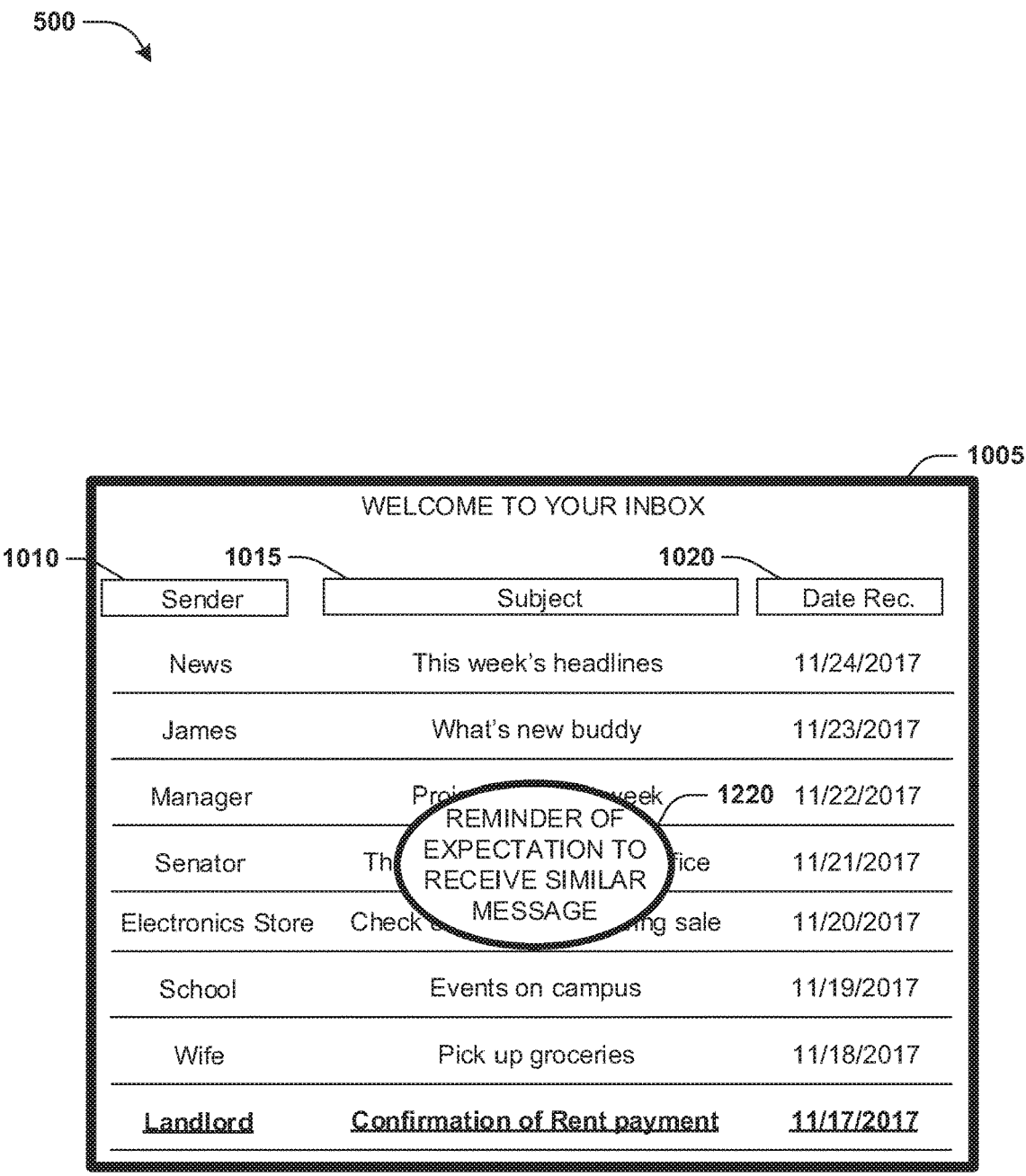
FIG. 13 is a component block diagram illustrating an example system for controlling a graphical user interface based upon a predicted messaging action of a messaging account.

As illustrated in FIG. 13, the system 500 may control the graphical user interface 1005 based upon the reminder 1220. For example, the graphical user interface 1005 may visually display the reminder 1220 concurrently with at least some messages in the mailbox 505 (e.g., when the time threshold is reached, or is within a threshold amount of time from being reached). The graphical user interface 1005 may highlight (e.g., via bolding, underling, coloring, animation, etc.) the representation of the fourth message 1205 such that the fourth message 1205 is visually distinguished from one or more other messages represented in the graphical user interface 1005. In some examples, based upon the reminder 920, the messages in the graphical user interface 1005 may be reordered such that the fourth message 1205 is displayed above one or more other messages (e.g., which may have been received after the fourth message 1205).

In some examples, the system 500 may identify an action object determined to cause receipt of the second message 515 and/or the fourth message 1205, such as a link, an address, an identifier, etc. (e.g., from the second message and/or the fourth message 1205) that the user may use (e.g., to pay a bill, etc.) to perform the one or more actions. The action object may be included in the reminder 1220, such that the action object may be selected (e.g., by the user) to perform an iteration of the one or more actions (e.g., pay a bill) to cause receipt of the fifth message.

In some example, at least some of the disclosed subject matter may be implemented by an operating system-level service that tracks events across a plurality of applications and/or services and generates and transmits reminders for the plurality of applications and/or services.

In some examples, at least some of the disclosed subject matter may be implemented on a client device, and in some examples, at least some of the disclosed subject matter may be implemented on a server (e.g., hosting a service accessible via a network, such as the Internet). For example, the client device may download one or more (e.g., and/or all) messages of the messaging account from the server, generate the expected action model using the downloaded messages and/or interactions, and perform predictions and generate corresponding reminders. Alternatively and/or additionally, the server may generate the expected action model, monitor interactions and perform predictions and transmit corresponding reminders to the client device. Alternatively and/or additionally, the expected action model may be generated on the server and then pushed to the client device for use in making predictions and generating corresponding reminders and/or for further updating based upon newly received messages.

In some examples, at least some of the disclosed subject matter that is discussed as being displayed and/or received via a graphical user interface may alternatively and/or additionally be presented and/or received as audio (e.g., via a speaker and/or microphone of the client device). For example, interactions may be received as audio input via a microphone and/or reminders may be presented as audio output via a speaker.

Implementation of at least some of the disclosed subject matter may lead to benefits including, but not limited to, a reduction in screen space and/or an improved usability of a display (e.g., of a client device). Alternatively and/or additionally, implementation of at least some of the disclosed subject matter may lead to benefits including a reduction in processing and/or power consumption (e.g., as a result of the user spending less time viewing, determining the significance of and/or acting upon the plurality of messages, as a result of a reduction of transmission and/or reception of data, as a result of not requiring a user to manually establish reminders with low levels of accuracy, etc.). Alternatively and/or additionally, implementation of at least some of the disclosed subject matter may lead to benefits including a reduction in bandwidth (e.g., as a result of performing one or more interactions when needed without a need to repeatedly access various messages to ensure that all interactions are performed).

Figure 14:
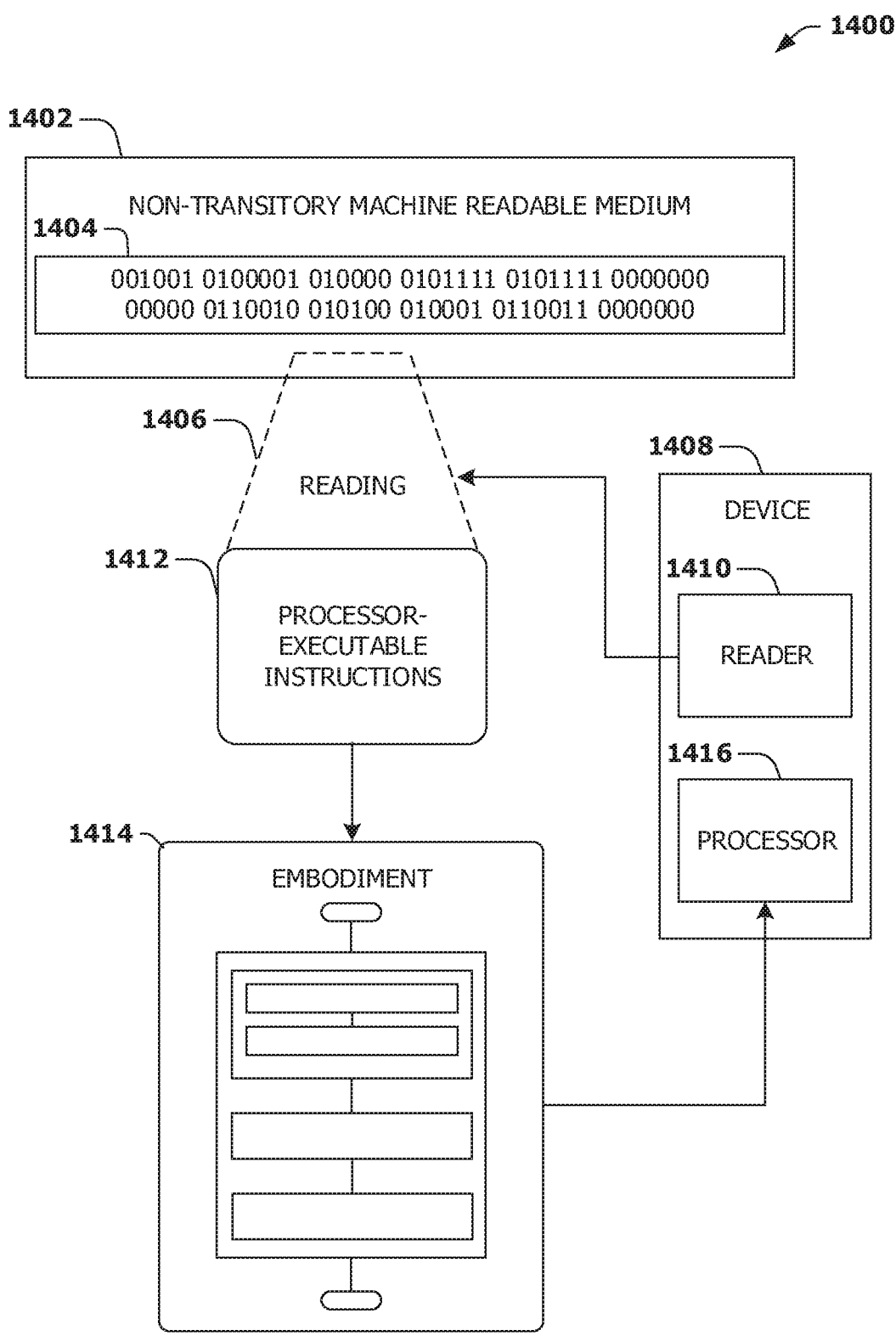
FIG. 14 is an illustration of a scenario featuring an example non-transitory machine readable medium in accordance with one or more of the provisions set forth herein.

FIG. 14 is an illustration of a scenario 1400 involving an example non-transitory machine readable medium 1402. The non-transitory machine readable medium 1402 may comprise processor-executable instructions 1412 that when executed by a processor 1416 cause performance (e.g., by the processor 1416) of at least some of the provisions herein (e.g., embodiment 1414). The non-transitory machine readable medium 1402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1402 stores computer-readable data 1404 that, when subjected to reading 1406 by a reader 1410 of a device 1408 (e.g., a read head of a hard disk drive, or a read operation invoked on a solid-state storage device), express the processor-executable instructions 1412. In some embodiments, the processor-executable instructions 1412, when executed, cause performance of operations, such as at least some of the example method 400 of FIG. 4, for example. In some embodiments, the processor-executable instructions 1412 are configured to cause implementation of a system, such as at least some of the example system 500 of FIGS. 5-13, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A method, comprising:
receiving a plurality of messages, associated with a messaging account, comprising a first message and a second message;
tracking interactions with the plurality of messages to generate a first set of message interactions for the first message and a second set of message interactions for the second message;
analyzing the plurality of messages to identify a first set of attributes for the first message and a second set of attributes for the second message;

generating an expected action model based upon a combination of (i) a user-specific expectation model generated for the messaging account using the first set of message interactions, the second set of message interactions, the first set of attributes and the second set of attributes, and (ii) a global expectation model generated for a plurality of user accounts based upon one or more interactions associated with at least some user accounts of the plurality of user accounts, wherein the one or more interactions comprise a set of message interactions comprising message interactions of a second user of a second messaging account of the plurality of user accounts and message interactions of a third user of a third messaging account of the plurality of user accounts;

predicting performance of a messaging action by a time threshold based upon the expected action model;

responsive to determining that the messaging action has not been performed by the time threshold, generating a reminder data structure; and controlling a graphical user interface using the reminder data structure.

2. The method of claim 1, comprising:

receiving a third message associated with the messaging account, wherein the messaging action comprises generating and transmitting a reply message to the third message, and the reminder data structure includes a reminder to generate and transmit the reply message.

3. The method of claim 1, comprising:

receiving a third message associated with the messaging account, wherein the messaging action comprises generating and transmitting a forward message for the third message, and the reminder data structure includes a reminder to generate and transmit the forward message.

4. The method of claim 1, comprising:

determining one or more actions that caused the receiving the first message based upon the expected action model, wherein the messaging action comprises receiving a third message with one or more similarities to the first message, and the reminder data structure includes a reminder to perform an iteration of the one or more actions.

5. The method of claim 1, wherein the messaging action comprises receiving a third message with one or more similarities to the first message, and the reminder data structure includes an indication of the determination that the messaging action has not been performed by the time threshold.

6. The method of claim 1, comprising:

receiving a request to disable the messaging action; and modifying the reminder data structure based upon the request.

7. The method of claim 1, comprising:

receiving a new set of messages;

tracking interactions with the new set of messages to generate sets of message interactions;

analyzing the new set of messages to identify sets of attributes; and modifying the expected action model based upon the sets of message interactions and the sets of attributes.

8. The method of claim 1, comprising:

receiving a request for a list of messaging actions predicted for the messaging account;

generating a messaging action data structure comprising the list of messaging actions; and controlling the graphical user interface using the messaging action data structure.

9. The method of claim 1, wherein the interactions comprise at least one of opening of a message, a replying to a message or a forwarding of a message.

10. The method of claim 1, wherein attributes of at least one of the first set of attributes or the second set of attributes comprise at least one of a sender of a message, a subject of a message, a body of a message, a time of an interaction with a message, a time of receipt of a message or a domain associated with a message.

11. A computing device, comprising:

a processor; and memory comprising processor-executable instructions that when executed by the processor cause performance of operations, the operations comprising:

receiving a plurality of messages, associated with a messaging account, comprising a first message and a second message;

at least one of:

tracking interactions with the plurality of messages to generate a first set of message interactions for the first message and a second set of message interactions for the second message; or analyzing the plurality of messages to identify a first set of attributes for the first message and a second set of attributes for the second message;

generating a first expected action model associated with the messaging account based upon at least one of:

the first set of message interactions and the second set of message interactions; or the first set of attributes and the second set of attributes;

determining message interactions of a second user of a second messaging account and attributes of messages received by the second messaging account;

determining message interactions of a third user of a third messaging account and attributes of messages received by the third messaging account;

generating a second expected action model associated with a plurality of messaging accounts based upon (i) a set of message interactions comprising the message interactions of the second user of the second messaging account and the message interactions of the third user of the third messaging account and (ii) a set of attributes comprising the attributes of messages received by the second messaging account and the attributes of messages received by the third messaging account;

predicting performance of a messaging action by a time threshold based upon the first expected action model and the second expected action model; and responsive to determining that the messaging action has not been performed by the time threshold, generating a reminder data structure.

12. The computing device of claim 11, the operations comprising:

receiving a third message associated with the messaging account, wherein the messaging action comprises generating and transmitting a reply message to the third message, and the reminder data structure includes a reminder to generate and transmit the reply message.

13. The computing device of claim 11, the operations comprising:
  receiving a third message associated with the messaging account,
  wherein the messaging action comprises generating and transmitting a forward message for the third message, and the reminder data structure includes a reminder to generate and transmit the forward message.

14. The computing device of claim 11, the operations comprising:
  determining one or more actions that caused the receiving the first message based upon at least one of the first expected action model or the second expected action model,
  wherein the messaging action comprises receiving a third message with one or more similarities to the first message, and the reminder data structure includes a reminder to perform an iteration of the one or more actions.

15. The computing device of claim 11,
  wherein the messaging action comprises receiving a third message with one or more similarities to the first message, and the reminder data structure includes an indication of the determination that the messaging action has not been performed by the time threshold.

16. A non-transitory machine readable medium having stored thereon processor-executable instructions that when executed cause performance of operations, the operations comprising:
  receiving a first message associated with a messaging account;
  accessing an expected action model indicative of associations between one or more message interactions and one or more message attributes, wherein the expected action model is based upon (i) a set of message interactions comprising message interactions of a second user of a second messaging account and message interactions of a third user of a third messaging account and (ii) a set of attributes comprising attributes of messages received by the second messaging account and attributes of messages received by the third messaging account;
  predicting performance of a messaging action by a time threshold based upon the expected action model; and
  responsive to determining that the messaging action has not been performed by the time threshold, generating a reminder data structure for the messaging account.

17. The non-transitory machine readable medium of claim 16, the operations comprising:
  receiving a second message associated with the messaging account,
  wherein the messaging action comprises generating and transmitting a reply message to the second message, and the reminder data structure includes a reminder to generate and transmit the reply message.

18. The non-transitory machine readable medium of claim 16, the operations comprising:
  receiving a second message associated with the messaging account,
  wherein the messaging action comprises generating and transmitting a forward message for the second message, and the reminder data structure includes a reminder to generate and transmit the forward message.

19. The non-transitory machine readable medium of claim 16, the operations comprising:
  determining one or more actions that caused the receiving the first message based upon the expected action model,
  wherein the messaging action comprises receiving a second message with one or more similarities to the first message, and the reminder data structure includes a reminder to perform an iteration of the one or more actions.

20. The non-transitory machine readable medium of claim 16,
  wherein the messaging action comprises receiving a second message with one or more similarities to the first message, and the reminder data structure includes an indication of the determination that the messaging action has not been performed by the time threshold.

* * * * *